United States Patent
Han et al.

(10) Patent No.: US 9,093,856 B2
(45) Date of Patent: Jul. 28, 2015

(54) DISPLAY DEVICE AND DISPLAY SYSTEM INCORPORATING WIRED AND WIRELESS CHARGING APPARATUSES

(71) Applicant: SAMSUNG ELECTRO-MECHANICS CO., LTD., Gyunggi-do (KR)

(72) Inventors: Myeong Woo Han, Gyunggi-do (KR); Joun Sup Park, Gyunggi-do (KR); Dong Woon Chang, Gyunggi-do (KR); Kwang Du Lee, Gyunggi-do (KR); Jung Aun Lee, Gyunggi-do (KR); Chan Yong Jeong, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 408 days.

(21) Appl. No.: 13/633,134

(22) Filed: Oct. 2, 2012

(65) Prior Publication Data
US 2013/0113421 A1      May 9, 2013

(30) Foreign Application Priority Data
Nov. 3, 2011   (KR) .................. 10-2011-0113942

(51) Int. Cl.
*H02J 7/00* (2006.01)
*H02J 7/02* (2006.01)

(52) U.S. Cl.
CPC .............. *H02J 7/0055* (2013.01); *H02J 7/025* (2013.01)

(58) Field of Classification Search
CPC ........... H02J 2007/0062; H04B 5/0075; H01F 38/14; B60L 11/182; Y02T 90/122; H01M 10/44
USPC .................................................. 320/107, 108
See application file for complete search history.

(56) References Cited

U.S. PATENT DOCUMENTS

| | | | |
|---|---|---|---|
| 2004/0066169 A1* | 4/2004 | Bruning | 320/108 |
| 2009/0058361 A1* | 3/2009 | John | 320/128 |
| 2009/0284082 A1* | 11/2009 | Mohammadian | 307/104 |
| 2010/0194206 A1* | 8/2010 | Burdo et al. | 307/104 |
| 2012/0214462 A1* | 8/2012 | Chu et al. | 455/418 |
| 2012/0294463 A1* | 11/2012 | Chu et al. | 381/150 |
| 2013/0221910 A1* | 8/2013 | Kim et al. | 320/108 |
| 2014/0159655 A1* | 6/2014 | Kim et al. | 320/108 |

* cited by examiner

*Primary Examiner* — Sun Lin
(74) *Attorney, Agent, or Firm* — Ladas & Parry, LLP

(57) ABSTRACT

Disclosed herein is a display system incorporating wired and wireless charging apparatuses, including: a switching processing unit supplying and processing a power of a power supply unit according to a mode selected through a switch; a wireless charging unit connected to the switching processing unit and including a pad for wireless charging; a wired charging unit connected to the switching processing unit and a terminal for wired charging; a display unit connected to the switching processing unit; and a control unit connected to the switching processing unit to control operations according to the mode.

10 Claims, 2 Drawing Sheets

DISPLAY DEVICE AND DISPLAY SYSTEM INCORPORATING WIRED AND WIRELESS CHARGING APPARATUSES

CROSS REFERENCE TO RELATED APPLICATION

This application claims the benefit of Korean Patent Application No. 10-2011-0113942, filed on Nov. 3, 2011, entitled "Display Device and Display System Incorporating Wired and Wireless Charging Apparatuses", which is hereby incorporated by reference in its entirety into this application.

BACKGROUND OF THE INVENTION

1. Technical Field

The present invention relates to a display device and a display system incorporating wired and wireless charging apparatuses.

2. Description of the Related Art

A wireless charging technology is a technology transmitting power required for wirelessly charging a battery without using a power cord or a charging connector. According to the prior art, the use of the wireless charging technology has been limited to an electric toothbrush, a household wireless phone, an electric power tool, or the like.

However, recently, in accordance with the explosive increase in smartphone markets, the wide use of the wireless charging technology has been accelerated. The smartphone allows users to freely enjoy rich contents and multimedia at any time, but has a limitation in that the use time is short due to a restricted battery capacity. A situation of the wireless charging technology in the smartphone markets has been significantly changed since 2010, in which the smartphones according to wireless charging has appeared. Then, in 2011, products that are provided with a wireless charging module for wirelessly charging mobile phones and smartphones have been released one after another both at home and abroad.

After wireless power consortium (WPC) targeting an expanding adoption of a non-contact type of standard specification has published a first standard specification targeting devices having an output of 5 W or less in July, 2010, many enterprises have been continuously joined to the organization (WPC). The wireless charging technology of which the market has been expanded due to the use of the smartphone is expected to be widely adopted to devices having large output, such as digital cameras, tablet PCs, monitors, digital TVs or the like.

Among several technologies enabling wireless charging, an electromagnetic induction scheme is excellent in view of production and commercialization. Here, the electromagnetic induction scheme uses an electromagnetic energy coupling generated between several wound coils disclosed in Korean Patent Laid-Open Publication No. 2010-0094197 (laid-open published on Aug. 26, 2010).

This scheme is based on Faraday's Law that a magnetic field generated by a coil in which AC or high frequency current flows generates an electromotive force at an output terminal of an adjacent coil. When general mobile phones, smartphones, digital cameras, or the like, mounted with a module for receiving wireless charging are put on a charging surface of a wireless charger which is configured of a module for transmitting wireless charging, an analog circuit, a power circuit, an control circuit, a rectifying circuit, a charging circuit, and the like, which are responsible for charging are operated, whereby a battery equipped within the device is charged.

However, the wireless charging apparatus according to the prior art needs to be separately purchased and be separately connected to a power supply device. Therefore, when there is no power supply terminal to which the wireless charging apparatus is separately connected, it is difficult to use the wireless charging apparatus.

SUMMARY OF THE INVENTION

The present invention has been made in an effort to provide a display device incorporating wired and wireless charging apparatuses, in order to solve the problems.

Further, the present invention has been made in an effort to provide a display system incorporating wired and wireless charging apparatuses, in order to have the object as described above.

According to a preferred embodiment of the present invention, there is provided a display device incorporating wired and wireless charging apparatuses, including: a switch provided on one surface of a support supporting a display unit and selecting a plurality of operating modes; a pad for wireless charging connected to the switch to be provided on one portion of a top surface of the support, and transmitting wireless power so as to perform wireless charging of a device for receiving wireless charging according to the operating modes; a terminal for wired charging connected to the switch and extending from the one portion of the support so as to perform wired charging according to the operating modes; a light emitting unit connected to the switch and confirming a state of wired charging or wireless charging according to the operating modes; and a display window connected to the switch to be provided on the one portion of the top surface of the support, and displaying operations of the pad for wireless charging or the terminal for wired charging and functions of the operating modes.

The operating modes may include a wireless charging mode using the pad for wireless charging, a wired charging mode through the terminal for wired charging, a display mode using the display unit, and an incorporated mode using both of the wireless charging mode and the wired charging mode.

The pad for wireless charging may be included to be adjusted at an angle θ with respect to one portion of the top surface of the support using a hinge joint or a sliding joint.

The light emitting unit may include a red LED and a green LED provided on the one portion of the support.

The terminal for wired charging may have any one of the connection terminal forms of a USB terminal, a serial terminal and a pin terminal according to a connection scheme of a device to be charged.

According to another preferred embodiment of the present invention, there is provided a display system incorporating wired and wireless charging apparatuses, including: a switching processing unit supplying and processing a power of a power supply unit according to a mode selected through a switch; a wireless charging unit connected to the switching processing unit and including a pad for wireless charging; a wired charging unit connected to the switching processing unit and a terminal for wired charging; a display unit connected to the switching processing unit; and a control unit connected to the switching processing unit to control operations according to the mode.

The switching processing unit may include at least one regulator and at least four terminals to which the switch is selectively connected.

The four terminals may include a terminal operated in a wireless charging mode using the wireless charging unit, a terminal operated in a wired charging mode using the wired charging unit, a terminal operated in a display mode in which it blocks a connection to the wireless charging unit and the wired charging unit and executes the display unit, and a terminal operated in an incorporated mode using both of the wireless charging mode and the wired charging mode.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
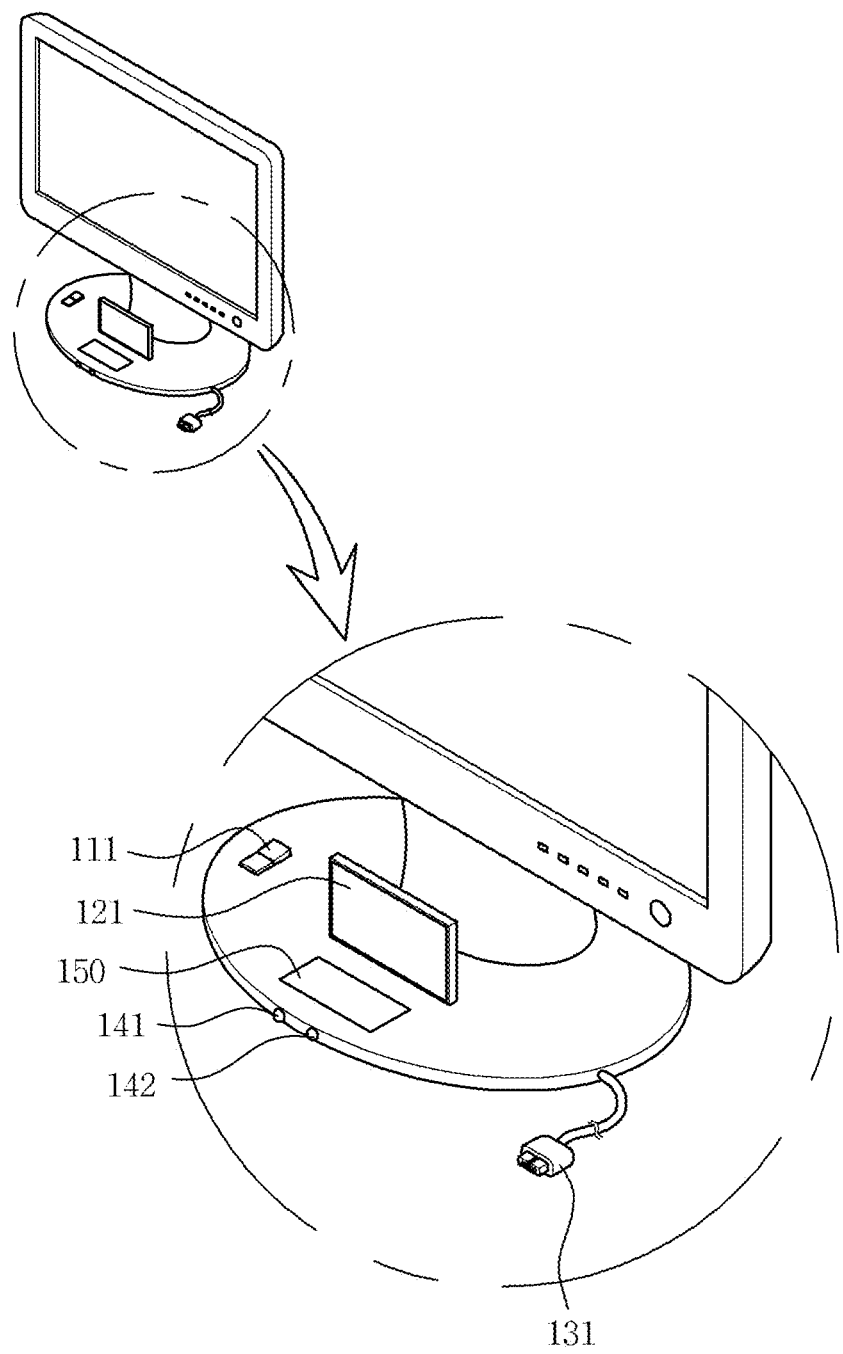
FIG. 1 is a view showing a display device incorporating wired and wireless charging apparatuses according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2:
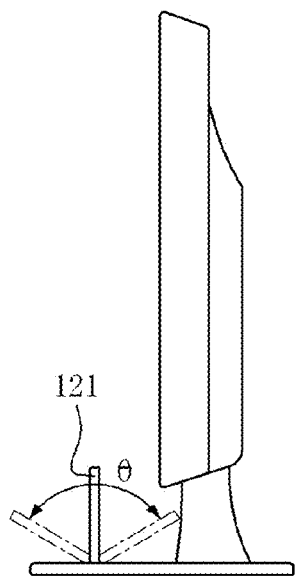
FIG. 2 is a side view of the display device incorporating the wired and wireless charging apparatuses according to the preferred embodiment of the present invention.

FIG. 1 is a view showing a display device incorporating wired and wireless charging apparatuses according to a preferred embodiment of the present invention. FIG. 2 is a side view of the display device incorporating the wired and wireless charging apparatuses according to the preferred embodiment of the present invention.

First, as shown in FIG. 1, the display device incorporating the wired and wireless charging apparatuses according to the preferred embodiment of the present invention may incorporatively apply wired and wireless charging apparatuses to display devices, such as digital TVs and monitor devices, or the like.

For example, when the wired and wireless charging apparatuses are applied to the display device such as the monitor device, the display device according to the preferred embodiment of the present invention includes a switch 111 selecting wired charging or wireless charging, a pad 121 for wireless charging, a terminal 131 for wired charging, light emitting units 141 and 142 confirming a state of the wired charging or the wireless charging, and a display window 150 confirming operations and functions of the pad 121 for wireless charging or the terminal 131 for wired charging, which are disposed on one surface of a support supporting a display unit such as a monitor.

The pad 121 for wireless charging is a plate-shaped member on which a device equipped with a module for receiving wireless charging is held to transmit a wireless power. The pad 121 for wireless charging may be equipped on one surface of the support of the monitor device through a hinge joint, a sliding joint, or the like. Therefore, as shown in FIG. 2, the pad 121 for wireless charging may be provided to be adjusted at a predetermined angle θ with respect to one surface of the support of the monitor device.

As such, when the pad 121 for wireless charging is adjusted at a predetermined angle θ with respect to one surface of the support of the monitor device, a user may conveniently confirm or use the device, while wirelessly charging the device held on a wireless charging surface of the pad 121 for wireless charging.

The terminal 131 for wired charging, which is a terminal that is extended from one side of the support of the monitor device to be connected to a device to be charged, separately from the pad 121 for wireless charging, may be provided in various connection terminal forms, such as a USB terminal, a serial terminal, a pin terminal, and the like, according to a connection method of the device to be charged.

The light emitting units 141 and 142 may be configured of a red LED 141 and a green LED 142, capable of confirming a state of the pad 121 for wireless charging or the terminal 131 for wired charging. Specifically, when the device for receiving wireless charging is normally held on the pad 121 for wireless charging or the device to be charged is normally connected to the terminal 131 for wired charging, the red LED 141 is turned on. Here, when the device for receiving wireless charging is abnormally held on the pad 121 for wireless charging or the device to be charged is abnormally connected to the terminal 131 for wired charging, the red LED 141 continuously blinks.

In addition, when the device for receiving wireless charging is normally wirelessly charging through the pad 121 for wireless charging or the device to be charged is normally connected to the terminal 131 for wired charging to be charging, both of the red LED 141 and the green LED 142 are turned on. Here, when the charging is completed, the green LED 142 continuously blinks.

The switch 111 is a switch for selecting at least one of a wireless charging mode through the pad 121 for wireless charging, a wired charging mode through the terminal 131 for wired charging, a display mode using only the display device, and an incorporated mode using both of the wireless charging mode and the wired charging mode.

The display window 150 may be provided on one surface closer to the pad 121 for wireless charging among surfaces of the support of the monitor device to display a selected mode selected through the switch 111 and allow a user to confirm the operation and function of the pad 121 for wireless charging or the terminal 131 for wired charging.

The display device incorporating the wired and wireless charging apparatuses according to the preferred embodiment of the present invention configured as described above may use wireless charging through the pad 121 for wireless charging or wired charging through the terminal 131 for wired charging using the switch 111 according to the selection of the user, while performing the original function of the display device.

Particularly, when the wireless charging is performed through the pad 121 for wireless charging, the user may use the device simultaneously with wirelessly charging the device held on the pad 121 for wireless charging.

Figure 3:
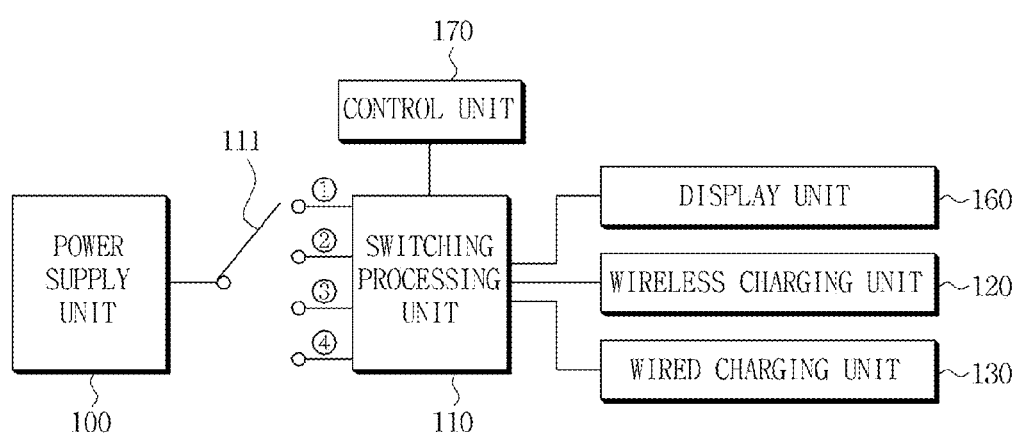
FIG. 3 is a block view describing a display system incorporating the wired and wireless charging apparatuses according to the preferred embodiment of the present invention.

Hereinafter, a display system incorporating the wired and wireless charging apparatuses according to the preferred embodiment of the present invention will be described with reference to FIG. 3. FIG. 3 is a block view describing the display system incorporating the wired and wireless charging apparatuses according to the preferred embodiment of the present invention.

As shown in FIG. 3, the display system incorporating the wired and wireless charging apparatuses according to the preferred embodiment of the present invention includes a switching processing unit 110 supplying and processing power of a power supply unit 100 according to the mode selected through the switch 111, a wireless charging unit 120 connected to the switching processing unit 110 and including the pad 121 for wireless charging, a wired charging unit 130 connected to the switching processing unit 110 and including the terminal 131 for wired charging, a display unit 160 connected to the switching processing unit 110, and a control unit 170 connected to the switching processing unit 110 and generally controlling wired and wireless charging modes.

The switching processing unit 110, which includes a switch 111 and at least one regulator, may be operated in various mode states through terminals ① to ④ using the switch 111.

Specifically, the display system may be operated in the wireless charging mode using the pad 121 for wireless charging by connecting the power supply unit 100 to the terminal ① of the switching processing unit 110 through the switch 111, be operated in the wired charging mode using the terminal 131 for wired charging by connecting the power supply unit 100 to the terminal ② of the switching processing unit 110 through the switch 111, be operated in the display mode using only the display unit 160 by connecting the power supply unit 100 connected to the terminal ③ of the switching processing unit 110 through the switch 111, and be operated in the incorporated mode using both of the wireless charging mode and the wired charging mode by connecting the power supply unit 100 to the terminal ④ of the switching processing unit 110 through the switch 111.

Therefore, the control unit 170 controls the wireless charging unit 120, the wired charging unit 130, and the display unit 160 according to the selected mode.

For example, when the power supply unit 100 is connected to the terminal ① of the switching processing unit 110 through the switch 111, the control unit 170 applies the power of the power supply unit 100 to the pad 121 for wireless charging and starts the wireless charging mode using the pad 121 for wireless charging, thereby wirelessly charging the device held on the pad 121 for wireless charging.

Alternatively, when the power supply unit 100 is connected to the terminal ③ of the switching processing unit 110 through the switch 111, the control unit 170 blocks the power supplied to the pad 121 for wireless charging and the terminal 131 for wired charging and supplies the power to only the display unit 160, such as the monitor or digital TV, thereby allowing the display system to perform only the functions of the monitor or digital TV.

In addition, when the power supply unit 100 is connected to the terminal ④ of the switching processing unit 110 through the switch 111, the control unit 170 applies the power of the power supply unit 100 to the pad 121 for wireless charging and the terminal 131 for wired charging, thereby allowing the display system to perform the incorporated mode capable of using both of the wireless charging mode using the pad 121 for wireless charging and the wired charging mode using the terminal 131 for wired charging.

Therefore, the display system incorporating the wired and wireless charging apparatuses according to the preferred embodiment of the present invention may separately or simultaneously use the wireless charging and the wired charging, while performing the original display function, such as the monitor or the digital TV, through the switching processing unit 110.

As set forth above, the wired and wireless charging apparatuses according to the preferred embodiment of the present invention can use wireless charging or wired charging according to the selection of the user, while performing the original functions of the display device.

Further, the display system incorporating the wired and wireless charging apparatuses according to the preferred embodiment of the present invention can use the device simultaneously with wirelessly charging the device for receiving wireless charging through the pad for wireless charging.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A display device incorporating wired and wireless charging apparatuses, comprising:
   a switch, which is provided on one surface of a support supporting a display unit, for selecting a plurality of operating modes;
   a pad for wireless charging, which is connected to the switch and to be provided on one portion of a top surface of the support, for transmitting wireless power so as to perform wireless charging of a device for receiving wireless charging according to the operating modes;
   a terminal for wired charging, which is connected to the switch and extending from the one portion of the support so as to perform wired charging according to the operating modes;
   a light emitting unit, which is connected to the switch, for confirming a state of wired charging or wireless charging according to the operating modes; and
   a display window, which is connected to the switch and to be provided on the one portion of the top surface of the support, for displaying operations of the pad for wireless charging or the terminal for wired charging and functions of the operating modes.

2. The display device as set forth in claim 1, wherein the operating modes include a wireless charging mode using the pad for wireless charging, a wired charging mode through the terminal for wired charging, a display mode using the display unit, and an incorporated mode using both of the wireless charging mode and the wired charging mode.

3. The display device as set forth in claim 1, wherein the pad for wireless charging is included to be adjusted at an angle with respect to one portion of the top surface of the support using a hinge joint or a sliding joint.

4. The display device as set forth in claim 1, wherein the light emitting unit includes a red LED and a green LED provided on the one portion of the support.

5. The display device as set forth in claim 1, wherein the terminal for wired charging has any one of the connection terminal forms of a USB terminal, a serial terminal and a pin terminal according to a connection scheme of a device to be charged.

6. A display system incorporating wired and wireless charging apparatuses, comprising:
- a switching processing unit supplying and processing a power of a power supply unit according to a mode selected through a switch;
- a wireless charging unit connected to the switching processing unit and including a pad for wireless charging;
- a wired charging unit connected to the switching processing unit and a terminal for wired charging;
- a display unit connected to the switching processing unit; and
- a control unit connected to the switching processing unit to control operations according to the mode.

7. The display system as set forth in claim 6, wherein the switching processing unit includes at least one regulator and at least four terminals to which the switch is selectively connected.

8. The display system as set forth in claim 7, wherein the four terminals include a terminal operated in a wireless charging mode using the wireless charging unit, a terminal operated in a wired charging mode using the wired charging unit, a terminal operated in a display mode in which it blocks a connection to the wireless charging unit and the wired charging unit and executes the display unit, and a terminal operated in an incorporated mode using both of the wireless charging mode and the wired charging mode.

9. The display system as set forth in claim 6, wherein the display unit is a monitor or a digital TV.

10. The display system as set forth in claim 6, wherein the switch is provided on one surface of a support supporting the display unit,
- the pad for wireless charging is provided on one portion of a top surface of the support, and
- the terminal for wired charging terminal is extended from the one portion of the support.

* * * * *